United States Patent
Dagaeff

(10) Patent No.: US 9,432,736 B2
(45) Date of Patent: Aug. 30, 2016

(54) SYSTEM AND METHOD FOR MANAGING A CONTENT CATALOGUE

(75) Inventor: Thierry Dagaeff, L'Isle (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 13/996,965

(22) PCT Filed: Dec. 1, 2011

(86) PCT No.: PCT/EP2011/071485
§ 371 (c)(1),
(2), (4) Date: Sep. 30, 2013

(87) PCT Pub. No.: WO2012/084447
PCT Pub. Date: Jun. 8, 2012

(65) Prior Publication Data
US 2014/0020026 A1    Jan. 16, 2014

Related U.S. Application Data

(60) Provisional application No. 61/426,536, filed on Dec. 23, 2010.

(51) Int. Cl.
| | |
|---|---|
| *H04N 5/445* | (2011.01) |
| *H04N 21/472* | (2011.01) |
| *H04N 21/231* | (2011.01) |
| *H04N 21/235* | (2011.01) |

(52) U.S. Cl.
CPC .... *H04N 21/47202* (2013.01); *H04N 21/2353* (2013.01); *H04N 21/23109* (2013.01)

(58) Field of Classification Search
USPC .......................................... 725/46, 52, 135
See application file for complete search history.

(56) References Cited

U.S. PATENT DOCUMENTS

| | | | |
|---|---|---|---|
| 5,721,911 A | 2/1998 | Ha et al. | |
| 7,013,478 B1 | 3/2006 | Hendricks et al. | |
| 2001/0047290 A1 | 11/2001 | Petras et al. | |
| 2002/0042923 A1 | 4/2002 | Asmussen et al. | |
| 2005/0097606 A1* | 5/2005 | Scott et al. | 725/52 |

(Continued)

FOREIGN PATENT DOCUMENTS

| | | |
|---|---|---|
| EP | 1 684 483 | 7/2006 |
| WO | WO 2007/103804 | 9/2007 |
| WO | WO 2008/134203 | 11/2008 |

OTHER PUBLICATIONS

International Search Report issued in PCT/EP2011/071485 mailed Mar. 30, 2012.

(Continued)

*Primary Examiner* — Jivka Rabovianski
(74) *Attorney, Agent, or Firm* — DLA Piper LLP US

(57) ABSTRACT

The present invention related to the domain of audio/video content distribution, where a catalog of available content is made available to end users. An aim of the invention is to ensure that the catalog has a high quality in that a search within the catalog will have a high probability of yielding a result. The invention provides a method and a system for creating useful links between elements in the catalog whenever it is deemed that such links be useful. The links between the elements are created either by adding new content to the catalog or new metadata which can be associated with the new content and existing content in the catalog.

13 Claims, 2 Drawing Sheets

(56) References Cited

U.S. PATENT DOCUMENTS

| | | |
|---|---|---|
| 2006/0031217 A1 | 2/2006 | Smith et al. |
| 2006/0167903 A1 | 7/2006 | Smith et al. |
| 2007/0208679 A1 | 9/2007 | Tseng et al. |
| 2007/0226077 A1 | 9/2007 | Frank et al. |
| 2008/0082416 A1 | 4/2008 | Kotas et al. |
| 2008/0091548 A1 | 4/2008 | Kotas et al. |
| 2008/0270351 A1 | 10/2008 | Thomsen |
| 2008/0270381 A1 | 10/2008 | Thomsen |
| 2008/0270382 A1 | 10/2008 | Thomsen |
| 2008/0270451 A1 | 10/2008 | Thomsen |
| 2008/0270462 A1 | 10/2008 | Thomsen |

OTHER PUBLICATIONS

Written Opinion issued in PCT/EP2011/071485 mailed Mar. 30, 2012.

* cited by examiner

SYSTEM AND METHOD FOR MANAGING A CONTENT CATALOGUE

CROSS REFERENCE TO RELATED APPLICATIONS

This application is a U.S. National Stage Application of International Application No. PCT/EP2011/071485 filed Dec. 1, 2011, which claims priority from U.S. Provisional Patent Application No. 61/426,536 filed Dec. 23, 2010. The entirety of all the above-listed applications are incorporated herein by reference.

FIELD OF THE INVENTION

This invention concerns the field of distribution of audio/video content, especially where a schedule for future broadcast of such content or a catalogue of availability of such content is made available to consumers in such a way that the consumer may make a selection from the content.

BACKGROUND OF THE INVENTION

With the rising amount of digital audio/video content being made available (such as movies, TV series, live events, documentaries), reflected in the increasing number of content sources (TV channels, VOD catalogue, internet stores) and content purchase methods available (pay-per-view, subscription, catch-up TV, pull and push VOD) and further compounded by the emergence of new content types (like user generated content), consumers now need very efficient tools to help them find content that fits with their preferences and expectations.

To satisfy these consumers' needs, operators offering content through their managed networks not only have to augment and improve the volume of their content on offer, but they must also follow up with an increase in the volume of metadata related to the content. The metadata must be rich enough to represent all consumers' needs in terms of tastes and expectations and therefore be translatable for use as content search criteria. Indeed, in order to help the user to find content, metadata has to describe the various aspects of content that the consumer is likely to use as search criteria. As a consequence, the management of content metadata by operators is becoming much more complex all along the value chain: from acquisition to rendering, through metadata storage, handling, examination, understanding, and delivery.

The present invention is applicable in the domain of audio/video content distribution in the context of broadcast content or video-on-demand content (VOD). In both cases the operator prepares a catalogue of available content, i.e. content assets, in advance. In the case of broadcast content this will take the form of a schedule for the broadcast of the content while in the case of VOD this will be a list of content assets in stock or otherwise accessible for viewing. In either case the list or the schedule are directly associated with the content. Along with the list of assets or the broadcast schedule, the operator also provides content metadata. The metadata is therefore associated with the content asset or with the content to be broadcast. The content metadata is also gathered in advance (i.e. before putting the corresponding content asset on-line or otherwise making it accessible or before the time advertised in the schedule for the broadcast of the corresponding content) .... Included in the meaning of gathering content metadata is the acquisition of metadata from third party metadata stores. Third parties may make use of the Internet to make available huge quantities of content metadata. It is possible therefore for an operator to expand upon content metadata currently available to him in relation to his assets or schedules by fetching more metadata from the Internet for use on top of the currently existing metadata.

Once acquired, metadata is stored in a database and associated in some way to the assets or scheduled events. The metadata is organised according to a number of meaningful fields such as description, contributor, origin among others. Standards such as "TV Anytime" for example may also be used for organising the metadata. Most often, metadata will be acquired in the format in which it will be delivered.

Once conveniently prepared, metadata can either be delivered with the content (i.e. embedded in VOD or broadcast streaming) or kept at back-end i.e. kept by the operator. The metadata may be directly accessible to the consumer for browsing, or filtered out in order to present consumer-personalized content information, or it may be made available for use by applications in charge of helping the consumer to find given content. Examples of such applications could be search tools or recommendation tools. In summary, the metadata could be used in browsing/exploring content, searching content or recommending content.

United States Patent Application Publication Number 2001/0047290A1 discloses a content management system primarily targeted for managing media accessible on the internet. The media is interlinked using hyperlinks and tags, which may therefore be interpreted as metadata. A measure of the degree of relevance of the hyperlinks or tags is carried out and the result is used to create further links between the media in the database. Furthermore the system inspects, for a particular user, a set of user-preferred tags and relates them to the media in the database. In this way the system can search relevant data for the user with a high level of success. Such systems are generally known in the state of the art and are used in technology providing recommendation functions.

United States Patent Application Publication Number 2006/0031217A1 discloses a method and a system for ontology-based classification of media content within a collection, involving acquiring content, associating classifiers with the content and arranging the classifiers in a hierarchical structure. The classifiers can be used to search through the collection. A confidence value for a classifier is attributed and may be modified by a boosting factor based on a correspondence between the confidence value and confidence values of ancestor classifiers in the hierarchical classification structure. By doing this a more accurate representation of the actual confidence that media content falls within the classification associated with the classifier is obtained. This method and system is therefore aimed at accurately classifying an existing collection.

BRIEF SUMMARY OF THE INVENTION

The known recommendation functions provided in the state of the art, generally based on prior knowledge of a user's preferences, are useful for ensuring a high success rate during search but these have no effect on the quality of a particular database, where importance is placed on improving the objective searchability of the database. Systems and methods based on such functions are generally more concerned with the quality of the content within the database and are generally focused on limiting the type of data included in the database rather than on the connections on inter-relations between the elements in the database.

Improvement upon known systems wherein hierarchical classification of classifiers associated with content is adjusted to accurately classify the content is required in order to improve objective searchability of the content rather than simply improve the classification of the content. The improvement should allow for modification and creation of links between the content and should further include the possibility of automatically adding content to the database to provide meaningful additional links thereby improving searchability. Such links are achievable by creating links between metadata associated with the content and without any particular structure being enforced between the metadata or the links.

The present invention provides for a database management system for content and associated metadata, where the quality of the database is automatically maintained/improved by maximizing the connectivity between the content and the metadata with a view to improving the searchability of the database. This maximizing is achieved both by adding more links between metadata and by adding further content to the database, the further content being found outwith the database using a search based on relevant metadata.

The invention provides a computer-based method for managing a content catalogue comprising a plurality of elements and at least one piece of metadata associable, according to predetermined association criteria, with at least one first element from said plurality of elements, said metadata being further associable, according to the predetermined association criteria, with at least one further element from said plurality of elements, said associations creating at least one link between the elements associable, according to the predetermined association criteria, with said metadata, said method comprising:

searching the content catalogue for at least one poorly-linked element from within the plurality of elements, said poorly-linked element having lower than a predetermined threshold number of links to any further element from the plurality of elements;

identifying at least one additional piece of metadata which, if associated with the poorly-linked element, would add at least one additional link between elements in the content catalogue; and if the identified additional piece of metadata is not present within the catalogue, then acquiring, for the content catalogue, the identified additional piece of metadata, such acquisition creating at least the additional link between elements in the catalogue;

redoing the method, from the step of searching the content catalogue, until the search yields no poorly-linked element.

The invention further provides a system for managing a content catalogue comprising a plurality of elements and at least one piece of metadata associable, according to predetermined association criteria, with at least one first element from said plurality of elements, said metadata being further associable, according to the predetermined association criteria, with at least one further element from said plurality of elements, said associations creating at least one link between the elements associable, according to the predetermined association criteria, with said metadata, said content catalogue further comprising at least one poorly-linked element having less than a predetermined threshold number of links to any further element from the plurality of elements, said system comprising:

a content acquisition module to acquire at least one additional element;

a catalogue quality measurement module, configured at least to detect the poorly-linked element;

said system characterised in that it further comprises:

a metadata acquisition module to acquire at least one additional piece of metadata, said additional metadata being associable at least with the poorly-linked element and an element from the plurality of elements; and a controller module configured to trigger the acquisitions of the additional metadata and the additional elements as long as the catalogue quality measurement module detects the poorly-linked element.

Accordingly, the present invention involves the addition of metadata associated with the content and moreover the addition of links between the metadata. No particular classification or structure need be given to the metadata without the need for classifying the metadata in a hierarchical structure. Thanks to the efficient linking of metadata and thereby the content itself, it is easy to include and properly link further content within the database to further improve the searchability.

The difficulty of finding content and understanding the catalogue is also an issue for the operators. Actually, the operator's objective is that any consumer actually finds content of interest to him inside the operator's database. The issue is not only about searching, it is about successful finding. Metadata and tools that enable efficient content search based on search filters, browsers, or recommendation engines, only provide the possibility for finding content. But the success of the search actually depends on the quality of the catalogue itself.

Each piece of operator-gathered metadata is primarily related to one element from the catalogue, in other words one piece of content i.e. the one for which it was fetched. Hence, the operator ends up with a huge database of content metadata that is accurate in describing each piece of content separately but not in providing an overview. Without the invention, methods to relate the content and build a content catalogue overview are still missing.

The proposed invention is a system and method to help the operator understand his catalogue, measure the quality of the catalogue, and take remedial action when the quality is deemed unsatisfactory. The proposed quality measure, around which the system is based, includes an assessment of the quantity of links created between content via metadata and the quality in terms of the meaning added by such links and the enhanced interpretation of the content thus made possible. The system also provides improvement remedies that include adding links between content through metadata, i.e. in using the metadata as links.

BRIEF DESCRIPTION OF THE DRAWINGS

The present invention will be better understood thanks to the detailed description which follows and the accompanying drawings, which are given as non-limiting examples of embodiments of the invention, wherein.

DETAILED DESCRIPTION

Figure 1:
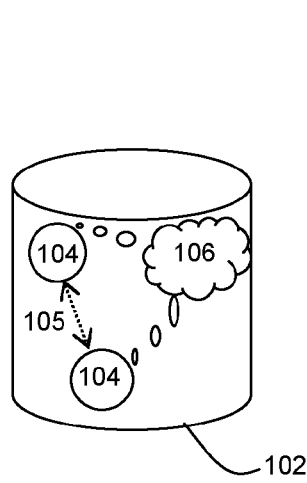
FIG. 1 depicts a content catalogue according to prior art to which embodiments of the present invention may be applied.

The present invention pertains to the domain of media content and more particular to systems employing content catalogues, especially in catalogues comprising content metadata. The invention proposes a content catalogue quality measure and proposes remedies to improve the quality of the catalogue in the case where the catalogue is deemed to be of insufficient quality. The invention further provides a system supporting said measurement and remedy actions in the applicable domain.

In this context, the measure of the quality of the content catalogue can be defined as giving an indication of the probability that a consumer is successful in finding a piece of content of interest to him, regardless of whichever search tool is used. Obviously, this measure depends on the content offer and on the content metadata associated with the content.

Indeed, the chances of finding content of interest depend on the content diversity: for example, if all documentaries in the catalogue are about the 19$^{th}$ century in Europe, or more realistically, if all the available movies are action and war movies, then it is conceivable that the probability of not finding content of interest could be very high for many consumers. Now, consider how this can be solved. First, the operator has obviously to enrich his offer to improve the diversity of the content (e.g. by adding content of the drama and comedy genres relating to various geographic places and time periods). Indeed, this is what is usually done. In parallel, metadata must also be able to describe this diversity: It must be able to provide the information to the consumer that there are drama and comedies, and that there are pieces of content relating to a particular geographic area or time period. This is why the definition and measure of content variety and metadata complexity are linked.

According to an embodiment of the present invention, it is proposed to measure metadata diversity in relation to content. Since metadata is associated with content, it follows that metadata diversity is related to content diversity. Metadata diversity could be measured simply by assessing the quantity of different information in the database, or more precisely, the quantity of different metadata. For instance, one can measure that the metadata carries information about many different genres, actors, directors or year releases, or many different time periods or fictional characters. However, this would not be sufficient since such measurement does not take account of the possibility that most of the identified metadata is related to a first, well described, subset of the entirety of the pieces of content, or elements, in the catalogue, while pieces of content from a second subset of the content are poorly described i.e. are un-related to metadata or related to fewer pieces of metadata. Thus, in order to avoid this distortion the measure must also take into account the distribution of the metadata among the pieces of content.

The embodiment of the present invention therefore provides for a measure which properly takes account of the distribution of the metadata among the pieces of content. This also fulfills a further requirement as will be outlined below, applicable in the case where the operator provides content search tools to the consumer. If the user enters a particular piece of information to search for content, it is better for the consumer to be presented with a choice of pieces of content rather than one unique piece of content (except in the case of very precise search criteria, targeting one specific piece of content, like a particular movie title for example). Indeed, the consumer likes choices, and the operator wants to provide several consumption opportunities. A requirement for presenting a plurality of pieces of content for the consumer to choose from during a search therefore exists, which is addressed by at least one embodiment of the present invention.

As mentioned before, there are two other usages of metadata apart from content search tools: namely recommendation and exploration. In both cases, one can consider the content offer is explored by the consumer starting from some given piece or pieces of content. This is obvious in the browsing case, which is close to content zapping, where the consumer discovers a piece of content and wants to discover related information and thereby related contents. This also applies to recommendation. This is obvious in the social recommendation case where a piece of content is recommended on the basis of a selected piece of content ("people who liked this content also liked . . . "). This still applies to recommendation technologies based on user profile, since it consists in telling what content the consumer is likely to like given what content he liked in the past ("since you liked this content, you'll also like . . . ").

Thanks to at least one embodiment of the present invention, when the consumer looks for new pieces of content starting from a given piece of content, by using available pieces of information, he will succeed in finding new content of interest if there are pieces of content in the catalogue that share those pieces of information or at least some of those pieces of information with the starting piece of content. In other words, thanks to the characteristic of the present invention whereby the achievement of a good distribution of metadata among the pieces of content is provided, the result is a distribution that establishes a well connected network of pieces of content and therefore a good catalogue quality. In this network, the pieces of content are nodes and the shared pieces of information, or metadata, are links. We will call this distribution "content-linkage". A good content-linkage addresses the distortion effect in the measurement of the content catalogue quality and simultaneously ensures the consumer will be able to explore or browse content, or be provided with valid recommendation.

By just adding more metadata without checking for links between content, one can get too fine a grain of information, with no more, or too few, content proposed for given search or recommendation criteria. This problem is obvious if a recommendation engine based on consumer-profiling is used. For the recommendation to work there must be content on offer to the consumers whatever their profile is. Since recommendation works by matching data describing the content with data describing the consumer, for each metadata 'type' used for the matching, there must be a number of pieces of content with corresponding metadata. The proposed system must then also act as a 'content recommendation preparation' system.

According to embodiments of the invention, the quality of the content catalogue is therefore measured through the quality of the content-linkage. It is a measure of the amount of metadata and of the amount of metadata shared between contents. This measurement paradigm has consequences on the integration of the measurement means in the content management process and on actions that the system can take to improve detected unsatisfactory situations. The invention addresses these aspects by proposing a system where means to measure such quality of the content-linkage are integrated to the means of content catalogue management.

According to an embodiment of the present invention, a content catalogue quality measurement module is included in the operator's equipment. By the nature of the proposed measure, the content must be known first. Thus, the module intervenes after a first step of content catalogue acquisition (VOD assets or schedules of broadcast events) and related metadata acquisition. It automatically measures the content linkage and provides a report of the measurement that includes an assessment of the quality.

Now consider the case where the quality of content linkage is insufficient. The system must support the definition of a quality threshold that defines at which level the quality is insufficient and allows the automatic detection of this case. The system can then automatically trigger remedy actions. For this, the report built by the measurement module is sent to a second module, the content catalogue quality improvement module, in charge of acting on the content catalogue in order to improve its quality if this is considered necessary.

By definition of the content catalogue quality, it is now obvious the remedies are of two types. First, the content catalogue can be improved by adding nodes to the network of content, i.e. pieces of content; this being a valid remedy if the metadata related to the new piece of content provides links to other pieces of content. Second, the content catalogue can be improved by directly adding metadata acting as missing links in the said network.

In all cases, the remedy implies being able to dynamically control the metadata fetching and improvement processes: in the case where content is added, it must be selected so that accompanying metadata can add links that are valuable for the catalogue quality. For this purpose, according to an embodiment of the present invention a content catalogue metadata controller module is included. This module controls the content acquisition module and the metadata acquisition module. The content catalogue metadata controller receives information relative to the quality of the content catalogue as part of a feedback loop wherein the quality is measured, remedial action is taken depending on the result of the measurement. Improvement is made by adding content and/or enriching metadata. Closing the loop, the quality is then measured again, remedial action taken again if necessary and so on until the desired improvement is achieved. In our first remedy case, the controller triggers the acquisition of new content of certain types by describing which kind of content is missing, and thus at least directly which kind of metadata is missing; it also performs the task of ensuring that metadata related to the candidate new content actually provide valuable links. The controller therefore instructs the content acquisition module to acquire content of a certain type (the type that is deemed to be lacking), which can be found either on the basis of the content itself or on the basis of any metadata that is associated with the content. The controller then inspects any metadata associated with the content to be acquired to ensure that the acquisition of such content would provide meaningful links in relation to the type of content which was deemed to be lacking. In a second case, the controller instructs the metadata acquisition module to fulfill the task of adding new metadata so as to create the missing links. This is referred to as enriching the metadata, whereby further metadata is associated with elements within the existing content or further metadata is associated with existing metadata. In both the first and second case described above, the catalogue quality is again measured and the controller decides again, based on information received from the quality measurement module, whether or not further improvement needs to be made. This measurement-improvement sequence can be iterated several times.

The metadata controller is thus in charge of enriching metadata; this in turn includes two types of actions: adding metadata to content, and/or adding metadata to metadata. This means adding description to existing metadata. For instance, a piece of metadata describing Quantum of Solace can be the Tosca opera; it can link Quantum of Solace to, say, a representation of the opera; now, by adding the metadata describing that Tosca is linked to Puccini (as its composer), one may have a link between Tosca and a documentary about Puccini, creating a longer path between Quantum of Solace and this documentary.

FIG. 1 depicts a situation to which embodiments of the present invention may be applied. A content catalogue (102) is shown comprising a plurality of elements and at least one piece of metadata (106). The metadata can be associated with at least one element. In the case depicted, the metadata is associated with both of the elements shown (104) thereby creating a link (105) between the two elements (104).

Figure 2:
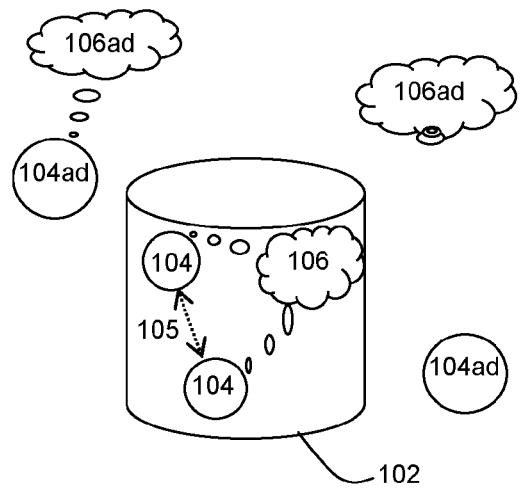
FIG. 2 depicts an environment in the prior art in which embodiments of the present invention may be deployed.

FIG. 2 depicts an environment in which embodiments of the present invention may be deployed. The content catalogue (102) is depicted with its elements (104) and metadata (106). Outside of the catalogue, additional elements (104ad) are shown. The additional elements in some cases may be associated with additional metadata (106ad). Additional metadata can also exist without being associated with an element. Elements are generally associable with metadata and vice versa.

Figure 3A:
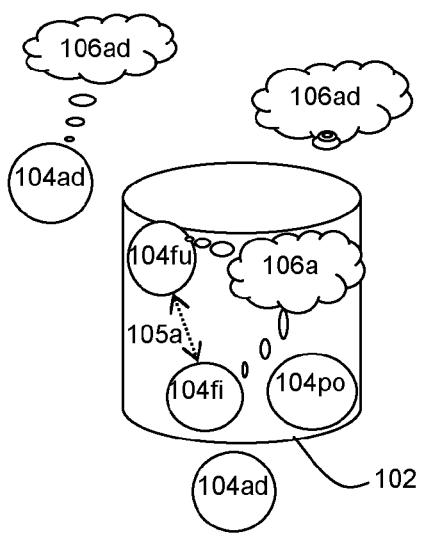
FIG. 3a illustrates a content catalogue to which embodiments of the present invention may be applied.

FIG. 3a illustrates the content catalogue comprising a first element (104fi) associated with a piece of metadata (106a) and a further element (104fu) associated with the same piece of metadata (106a). This mutual association creates a link (105a) between the first element (104fi) and the further element (104fu). The figure also illustrates another element in the catalogue (104po) which is not linked to any other element. We refer to this element as being a poorly linked element (104po). The poorly-linked element (104po) may, in some cases, be associated with its own metadata (106po), so for the sake of continuing with the illustration of the element being poorly linked, we say that any such metadata (106po) is not associated with any of the other elements. Since this metadata (106po) is not associated with any other elements in the catalogue, and since the poorly-linked element (104po) is not associated with any of the other metadata in the catalogue, it does not create a link. Outside of the catalogue there exists an additional element (104ad) which may be associable with the same piece of metadata as the poorly linked element (in the case that the poorly-linked element is associated with metadata). By including the additional element into the catalogue, at least one new link can therefore be created. If the additional element had its own metadata associated with it, then it could even arise that further links could be created if that metadata were associable with any of the other elements already in the catalogue. Alternatively, even if the poorly linked element were not associated with metadata of its own, merely identifying any additional piece of metadata which could be associated with any of the elements already in the catalogue and with the poorly linked element would allow for more links to be created. By acquiring an additional element from outwith the catalogue, said additional element being associable with, or already associated with, the newly identified additional metadata, the inclusion of such an additional element to the catalogue would create desirable links. By desirable links, this means links between the poorly linked element and at least one other element within the catalogue.

Figure 3B:
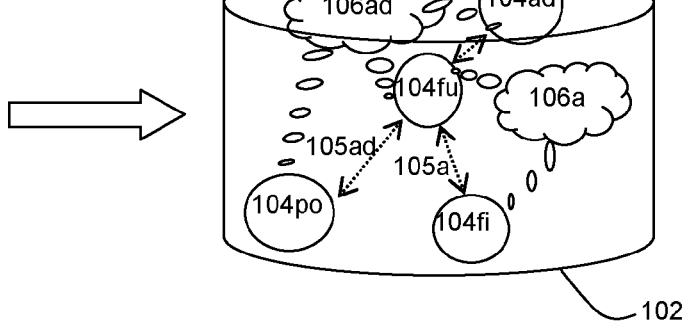
FIG. 3b illustrates the content catalogue of FIG. 3a upon which an embodiment of the present invention has been applied.

Another way to create such desirable links, rather than acquiring additional elements having, or being associable with, the identified (missing) metadata, such metadata (106ad) itself could be acquired and appropriately added to the catalogue by associating it with the poorly linked element and another element. Furthermore, such additional metadata may be associated with other metadata within the catalogue as well as with elements in the catalogue. This association of metadata with metadata is also useful in providing the desirable links. FIG. 3b illustrates the creation of additional links in the content catalogue by the inclusion of additional elements and/or additional metadata.

The particular example shown in FIGS. 3a and 3b covers a case where the poorly-linked element has no associated metadata but is associable with an identified additional piece of metadata existing outwith the catalogue. An additional element also exists outwith the catalogue which is also associable with the additional metadata. By acquiring the additional metadata it can be associated with the poorly-linked element. If the additional metadata is also associable with the further element in the catalogue for example, then a link is created between the poorly-linked element and the further element. If the additional element is acquired for the catalogue, then it can be associated with the additional metadata, which in turn can be associated with the poorly-linked element.

It is worth clarifying the use of the word associable in the context of the present invention. When a piece of metadata is said to be associable with an element, once the said element is included into the catalogue, whether or not a specific step of associating the element with the metadata is expressly enumerated does not change the final outcome of the association being made. The mere fact that a piece of metadata is associable with an element implies a possible eventual association. In this manner, if an element outwith the catalogue is not associated with a particular piece of metadata but is associable with a piece of metadata which exists within the catalogue, then once the element is included in the catalogue, the association will be made. Similarly, when a piece of metadata is acquired from outwith the catalogue and is associable with an element in the catalogue, such association is implicitly made. The fact of whether or not a piece of metadata is associable with an element depends on predetermined association criteria. For example, the criteria could include an element such as a film being associable with a year or with an actor or with a director.

Figure 4:
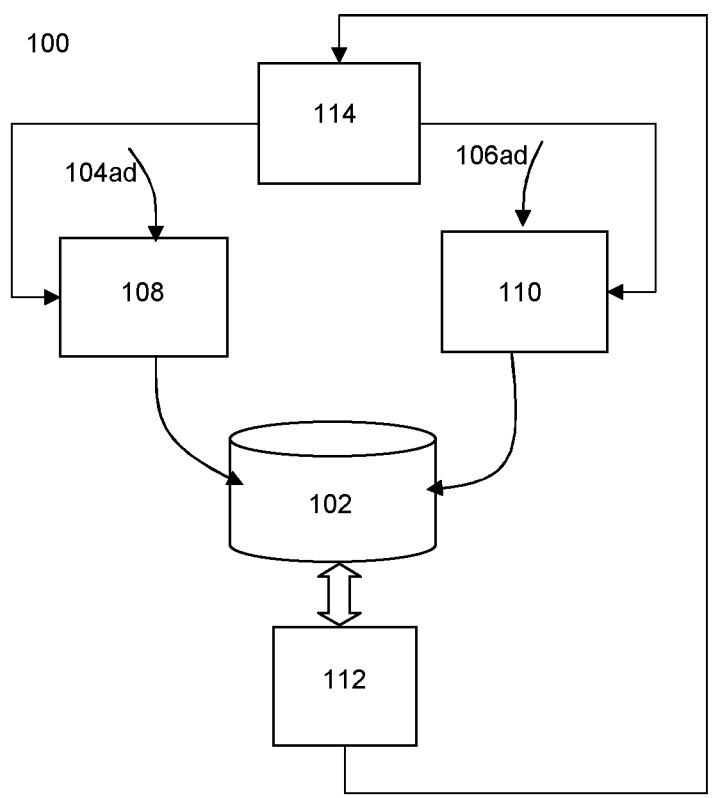
FIG. 4 shows a system in which an embodiment of the present invention may be deployed.

FIG. 4 shows a system in which an embodiment of the present invention may be deployed. The system is aimed at managing a content catalogue (102) with a view to optimising the searchability of the catalogue. The catalogue (102) comprises content, each piece of content otherwise being referred to as an element (104fi, 104fu, 104po). Each element may be associated with one or more pieces of metadata (106a), the metadata being useful for searching the catalogue for one or more particular elements (104fi, 104fu, 104po). According to the embodiment, the system further comprises a content acquisition module (108) to acquire additional elements (content) (104ad) for the catalogue and a metadata acquisition module (110) to acquire additional metadata for the catalogue as described above. It is to be understood that the content, whether already existing or further acquired, may already be associated with metadata and therefore any inclusion of such elements into the catalogue implies an inclusion also of such already associated metadata.

The system, according to the embodiment, further comprises a catalogue quality measurement module (112), whose job it is to measure the quality of the catalogue in terms of its searchability, which depends on the metadata diversity. As discussed in relation to the invention, the searchability also depends on content linkage. The object is to improve the quality of the catalogue, or in other words improve the searchability of the catalogue, thereby raising the probability of finding a target element during a search. Following the measurement of the quality, if the probability of finding a target element is below the predetermined threshold, then improvement is made. This loop is continued until the threshold has been achieved. A controller module (114) is in charge of controlling the actions needed to improve the quality. According to the embodiment of the invention, the actions which may be taken by the controller include controlling the content acquisition module to acquire further content based on metadata which is deemed by the measurement module to have been lacking within the catalogue. According to the embodiment the controller further controls the enrichment of the metadata within the catalogue by controlling the metadata acquisition module (110) to acquire further metadata (106) to associate with the existing content or to associate with existing metadata within the catalogue. Among the actions which may be taken by the controller then is to allow the metadata controller to control the metadata acquisition module to perform such a task. The result is then an improvement in content linkage, which leads to the desired improvement in searchability. The chances of finding something during a search are therefore greatly increased thanks to the invention.

The system according to embodiments of the present invention may be realised in many different ways as will be readily apparent to one of ordinary skill in the art. For example, in one embodiment, the content catalogue may be a database on a server and the system may comprise a processor and computer memory. The elements may be VOD assets or schedules of broadcast events for example and the metadata could be something that describes or may be otherwise related to an event, such as the name of an actor or director or a word describing the genre of the event for example. The processor may be programmed to analyse the quality of the catalogue and to trigger remedial actions should the quality be below an expected threshold. Alternatively some or all of the devices in the system may be dedicated hardware devices, which may comprise some combination of hardware, software and/or firmware.

In a preferred embodiment of the invention, the content metadata is managed, structured and enriched using a content-topic structure: topics are categorised by domains, the link between the content and the metadata is defined in a semantic link, automatic data fetching and data expansion processes are iterated. This complies well with the measurement requirements: the quantity of different information for one given piece of content is simply the quantity of topics concerned by the content that he topic extractor was able to get (i.e. the gathering of metadata). A remedy in this case is to run the topic expander more times (i.e. fetching of more metadata). In this case, the applied measurement and improvement requirements are the following: have several topics per piece of content, and have several pieces of content per topic.

In this case, the measurement method can just be a measure of the quality of a topic. This depends on the number of related domains: if a topic belongs to many domains it is rich information. Conversely, if a topic is related to too many contents through the same semantic link, the link becomes useless. It means the link is irrelevant. The method can define a minimum and maximum of semantic links per topic. In addition, importance of a topic per-se can be measured using a characterization of the semantic link and domain importance per-se: for instance, some domains can be considered of less importance by the operator e.g. political domains, or highly cultural domains.

In an embodiment, in order to limit the total amount of stored metadata, the methods implemented by the metadata controller may also include removing topics of less quality, i.e. topics that do not link many pieces of contents or even no content at all. The method can also keep a topic but remove its links to a given piece of content according to the link quality. In the preferred embodiment, such methods control the topic structure by removing or adding semantic links and domains.

The number of times the measurement-improvement sequence is iterated can be controlled by the operator. Alternatively, the system, consisting in modules implementing automatic processes can be configured to automatically stop the iteration once certain criteria are reached. The stopping criteria may depend on the result of the quality measurement; it can obviously be that the quality threshold is reached. The stopping criteria may also depend on an assessment of the possibility to improve the catalogue and the metadata.

The simplest implementation of the content catalogue quality improvement module consists in a human controlled module. In an embodiment, the remedy will be proposed as a list to the human operator who will then decide which action he will actually trigger. In the preferred embodiment however, some remedies are automatically triggered; in this case, the definition of iteration stopping criteria is a necessity. They depend on the possibility and the relevancy to add topics relating contents, which in turn depends on the topic database size (one has to stop at some time for practical reasons like storage capacity) and the length of paths created between contents through metadata. Indeed, a too long path (e.g. Quantum of Solace—Tosca—Puccini—Italy—Toscana—Wine—A movie with oenologists) may be difficult to apprehend by the final consumer. The means to stop the iteration in the preferred embodiment may consists in the definition of a maximum length of topic chains, or in the definition of a minimum number m of related contents for each topic added at iteration n: at iteration n, a new topic is added in the database if, and only if, it is related to a sufficient number of other contents. Typically the function m(n) will be increasing with n: at iteration n, the distance between a new topic and the enriched content is longer than at previous iteration, so that the reason to add the topic must be stronger.

In an embodiment, the measure of the quality of the content catalogue is based on the theory of networks and actually measure the connectivity of the network made of content nodes and metadata links.

In an embodiment, the measure of the quality of the content catalogue also takes into account links between products. Indeed, the operator's goal is that content proposed to the consumer in response to his queries is relevant but also multiple so to have an opportunity to sell more of its catalogue. By definition, the proposed measure and improvement modules and methods, by focusing on content-linkage, are just designed to provide more content on offer for a given query criteria. If the proposed content must be paid to be accessed, as it is the case for VOD assets, the operator actually increases the revenues by offering more related contents. However, if the content is part of scheduled broadcast channels, the consumer will not have to pay if he already has access to the said channel. By products it is meant content providing a potential for earning revenue or a plurality of pieces of content so related as to provide a potential for earning revenue. As the distribution of metadata associated with content is described as content-linkage, so the distribution of metadata associated with products can be described in terms of "product-linkage". The measurement method can thus take into account the product-linkage by looking at the product packages to which linked contents belong. The product-linkage is improved by adding content or metadata, as in content-linkage improvement, that establishes links between contents that belong to different product packages. This method will result in a statistical increase of the product sales notice this is only statistical since it is not based on a consumer model.

In an embodiment, the operator may use this control and knowledge of its catalogue to build packages of pieces of content to be sold together, or expose the content to the consumer in a different way in order to drive more sales. The improvement module may encompass methods to bundle products according to clusters in the network of contents.

In an embodiment, the system is based on human intervention at each module level, relying on trained professionals that are aware of the data meaning from a human point of view.

The invention proposes several measurement methods, which can adapt to the metadata structure, in various embodiments that can be supported by the measurement module. Its nature as a module allows the modification of the measurement methods at any time. The modification can include changing measurement parameters, like the quality thresholds, or in adding or removing the execution of measurement methods.

The modularity also brings an important advantage. When a new aspect of content catalogue quality is to be addressed, a corresponding measurement method can be added to the measurement module without having to modify the other modules. Indeed, the requirement of the iteration processes is just to satisfy the quality criteria, but is independent of it.

As an example consider the following problem. The metadata controller implementing enrichment processes could provide irrelevant data (inflated meaningless data) or incomplete data (poor or missing data). Irrelevancy may appear for instance from errors in the analysis of data source or mismatching resource identifiers (e.g. bad typed names). Incompleteness may be due for instance to insufficient data sources or to badly defined criteria for limiting data fetching. If one measures only the fact that content are well linked, there may be several links between two pieces of contents and just one between two other pieces; the first pieces may be related to many metadata and the other may be related to a few. They result in a confusing consumer experience: some of the pieces of content may be accompanied with surprisingly accurate information, whereas some other may suddenly lack relationships to obvious related topics or lead to following completely out-of-scope, unintended links. This is also a distortion problem, now about the link quantity rather than in the metadata quantity as in the starting problem. To overcome this problem, it is sufficient to include in the measurement methods a measure of the uniformity of the linkages.

A system in which an embodiment of the present invention may be deployed for example would allow for the management of a content catalogue and its associated metadata, such management including the improvement of the quality of the catalogue. By improvement in quality we have seen that this includes improving the content-linkage within the catalogue, where an aim is to prevent the content linkage from going below a predetermined threshold. The catalogue may be a catalogue of VOD content and/or event schedules. The system comprises a content acquisition module for acquiring content assets and/or event schedules for the catalogue along with any metadata already associated therewith; a metadata acquisition module for acquiring metadata which may be associated with the content/schedules, the metadata being able to be structured according to some predetermined description semantic; a content catalogue quality measurement module for assessing and reporting on the catalogue quality by measuring content linkage i.e. the connectivity of content in the network, said connectivity being created through the contents' shared metadata; a content catalogue quality improvement module to trigger the system to employ remedial action to improve the content catalogue quality; a content catalogue metadata controller module to fetch and enrich metadata. In this system the content catalogue quality measurement module sends its report to the catalogue improvement module, which in turn triggers the content catalogue metadata controller module to add content and metadata that improve the content-linkage. The content catalogue improvement module may indeed be part of the controller module. A quality threshold is used to determine when to begin the improvement process. The content catalogue metadata controller may take such actions as adding metadata to content, thereby possibly relating some pieces of content to other pieces of content, or to relate existing content to other content or to add metadata to metadata. The content linkage is re-assessed before a decision is taken whether or not to re-iterate the improvement process.

Metrics which can be used in assessing the content-linkage may include competency: i.e. rate of answered Competency Questions, per content per domain (may pre-define CQ list or let user define CQ); completeness: rate of domain and category filling, per content (where domain and categories are different content data typing in the GUI content ontology; if subcategories are defined locally i.e. not for the end-user—they can be used too); interconnectivity: rate of content directly or indirectly linked, per content; interconnectivity quality: rate of content directly or indirectly linked, per content and per related content data item; graphical display of interconnectivity; relevancy: rate of redundancy of some data items through the various data sources.

Remedial action which may be taken to improve the quality include fetching more predefined sources; automatic finding and fetching new sources; manual insertion, modification, or deletion of data; adding new content to the catalogue.

In other embodiments of the present invention any of the algorithms known in the state of the art could be used for computing the connectivity between the metadata and the content, for example any of the known algorithms for determining network connectivity. No particular restrictions are made about the interpretation of the metadata and therefore no particular structure is given to the metadata. The connectivity between the metadata and the content is of importance and not the interpretation of the metadata itself i.e. not the quality of the metadata itself but the quality of the links. In the case where the algorithm returns value indicating a poorly linked catalogue, a remedy is to add connectivity and not simply to add metadata. To do this it is also possible to add further content, the further content becoming appropriately linked within the catalogue. Quality improvement does not act on the interpretation or structure of the metadata itself.

An advantage of the invention is to not rely on consumer profiles. Hence, content and product linkages are measured in a generic way, prepared once for all, independently and in advance of the future search performed by the consumers. This allows having a data structure valid for all consumers. By preparing data and content linkage through metadata, one obtains content and products that have meaningful relationships that can be followed by all consumers.

Another advantage of the invention is that it may be applied even to TV sets having no return path. By preparing data and content linkages through metadata, one obtained content and products that have meaningful relationships and the metadata sent in-line with the content can just consist in these links.

The invention claimed is:

1. A computer-based automated method for improving a quality of a content catalogue, the content catalogue comprising a plurality of elements and at least one piece of metadata associable according to predetermined association criteria with at least one element, a link between two elements in the content catalogue being created when a piece of metadata is associated according to the predetermined association criteria with two elements in the content catalogue, each element being associable with one or more pieces of metadata, the metadata being useful for searching the content catalogue for one or more particular elements, said method comprising:
  a) measuring, by a content catalogue quality measurement module executed by a processor, the quality of the content catalogue by assessing at least one of a quantity of links in the catalogue, a variety of the elements, diversity of the metadata, a distribution of the metadata among the elements or a connectivity of a network comprising elements and links in the content catalogue;
  b) if the measured quality is below a predetermined threshold defining an insufficient quality level, then identifying, by a metadata acquisition module executed by the processor, at least one additional piece of metadata associable with two elements in the content catalogue;
  c) acquiring for the content catalogue, by a content acquisition module executed by the processor, the identified additional piece of metadata, such acquisition creating at least one additional link in the content catalogue; and
  d) repeating steps a)-c) if the measured quality is below the predetermined threshold, thereby controlling, by a controller module, the metadata acquisition module to acquire further metadata to associate with the existing content or to associate with existing metadata within the catalogue, and making the content catalogue distributable.

2. The computer-based method according to claim 1, wherein said identified additional piece of metadata is acquired.

3. The computer-based method according to claim 1, wherein step c) includes acquiring at least one additional element from outside of the content catalogue, said at least one additional element being associable with the identified additional metadata.

4. The computer-based method according to claim 3, wherein said at least one additional element from outside of the content catalogue is associable with the additional metadata.

5. The computer-based method according to claim 1, wherein the at least one additional link involves a poorly-described element in the content catalogue, said poorly-described element being not associated with any metadata or associated with few pieces of metadata.

6. An automated system for improving a quality of a content catalogue, the content catalogue comprising a plurality of elements and at least one piece of metadata associable according to predetermined association criteria with at least one element, a link between two elements in the content catalogue being created when a piece of metadata is associated according to the predetermined association criteria with two elements in the content catalogue, each element being associable with one or more pieces of metadata, the metadata being useful for searching the content catalogue for one or more particular elements, said system comprising:
- a memory for storing the content catalogue;
- a content acquisition module executed by a processor and being configured to acquire at least one additional element;
- a catalogue quality measurement module executed by said processor and being configured to measure a quality of the content catalogue by assessing at least one of a quantity of links in the catalogue, a variety of the elements, diversity of the metadata, a distribution of the metadata among the elements or a connectivity of a network comprising elements and links in the content catalogue;
- a metadata acquisition module executed by said processor and being configured to acquire at least one additional piece of metadata, said additional metadata adding at least one additional link to the content catalogue; and
- a controller module executed by a processor and being configured to control the metadata acquisition module to acquire further metadata to associate with the existing content or to associate with existing metadata within the catalogue as long as the catalogue quality measurement module indicates that the measured quality is below a predetermined threshold defining an insufficient quality level, and making the content catalogue distributable.

7. The system of claim 6, wherein the at least one additional piece of metadata is acquired.

8. The system of claim 6, wherein the at least one additional link involves a poorly-described element in the content catalogue, said poorly-described element being not associated with any metadata or associated with few pieces of metadata.

9. The computer-based method according to claim 2, further comprising acquiring at least one additional element, said at least one additional element being associable with the additional metadata.

10. The computer-based method according to claim 2, wherein the at least one additional link involves a poorly-described element in the content catalogue, said poorly-described element being an element not associated with any metadata or an element associated with few pieces of metadata.

11. The computer-based method according to claim 3, wherein the at least one additional link involves a poorly-described element in the content catalogue, said poorly-described element being an element not associated with any metadata or an element associated with few pieces of metadata.

12. The computer-based method according to claim 4, wherein the at least one additional link involves a poorly-described element in the content catalogue, said poorly-described element being an element not associated with any metadata or an element associated with few pieces of metadata.

13. The computer-based method according to claim 9, wherein the at least additional link involves a poorly-described element in the content catalogue, said poorly-described element being an element not associated with any metadata or an element associated with few pieces of metadata.

* * * * *